United States Patent [19]

Bundy

[11] Patent Number: 4,801,857
[45] Date of Patent: Jan. 31, 1989

[54] SERVO LOOP CONTROL SYSTEM WITH DYNAMIC LIMITING

[75] Inventor: John E. Bundy, Rockford, Ill.

[73] Assignee: Sundstrand Corporation, Rockford, Ill.

[21] Appl. No.: 900,721

[22] Filed: Aug. 27, 1986

[51] Int. Cl.[4] .............................................. G05G 5/00
[52] U.S. Cl. ..................................... 318/626; 91/506; 60/911; 318/311
[58] Field of Search ....................... 318/626, 615-617, 318/619, 561, 628, 302, 345 A, 306, 309-311; 328/169, 172, 175; 307/493, 546, 551; 91/506; 60/911, 445, 448; 417/217, 222

[56] References Cited

U.S. PATENT DOCUMENTS

| | | | |
|---|---|---|---|
| 3,437,836 | 4/1969 | Hull | 307/555 |
| 3,514,635 | 5/1970 | Gilbert | 307/553 |
| 3,697,780 | 10/1972 | Michael et al. | 307/360 |
| 3,916,330 | 10/1975 | Weissman | 328/171 |
| 3,999,084 | 12/1976 | Beaudette | 307/563 |
| 4,095,126 | 6/1978 | Hoffman et al. | 307/553 |
| 4,487,109 | 12/1984 | Burandt et al. | 91/506 |

Primary Examiner—William M. Shoop, Jr.
Assistant Examiner—David S. Martin
Attorney, Agent, or Firm—Wood, Dalton, Phillips, Mason & Rowe

[57] ABSTRACT

A servo system having a circuit for developing an error signal representing the deviation of a load condition from a desired condition represented by a command signal and forward and feedback paths at least one of which includes an impedance therein represented by a transfer function comprises a limiter receiving the command signal and connected to the error signal developing circuit for controllably limiting the command signal wherein the limiter has a variable saturation point and a circuit coupled to the limiter and to the impedance for controlling the saturation point of the limiter in accordance with the transfer function of the impedance to enable fast response without damage to an output device controlled by the servo system.

4 Claims, 6 Drawing Sheets

SERVO LOOP CONTROL SYSTEM WITH DYNAMIC LIMITING

TECHNICAL FIELD

The present invention relates generally to control systems, and more particularly to a closed-loop or servo loop type control system for controlling an output device so that a specified load condition is attained.

BACKGROUND ART

Control systems of the closed-loop or servo loop type are known wherein the control operates an output device so that a desired or commanded load condition is attained. One example of such a control is disclosed in Burandt et al U.S. Pat. No. 4,487,109, assigned to the assignee of the instant application and the disclosure of which is hereby incorporated by reference. The control disclosed in this patent is particularly adapted for use in operating a power drive unit which in turn drives a load, for example a component of a flight control system of an aircraft. The power unit includes a swashplate or wobbler, the displacement of which is adjustable by means of a servo valve and a control cylinder to vary the torque developed at an output shaft of the power unit. The control system includes transducers for sensing the speed of the output shaft, the displacement of the wobbler and the position of the load. These transducers are coupled to first inputs of a series of summing junctions which develop error signals representing the deviation of an actual output condition from a desired condition. More specifically, a first summing junction receives a command signal at a second input thereof. The output of the first summing junction is coupled to the second input of the second summing junction, and the output of the second summing junction is coupled to the second input of the third summing junction. The output of the third summing junction is coupled to a current driver to signal inputs of the servo valve.

In operation, the wobbler displacement is controlled in accordance with the command signal so that the load is driven to a desired or commanded position.

The wobbler displacement is variable between mechanical stops or limits. At times, it may occur that the command signal is such that the wobbler is driven into contact with one of the mechanical stops. This could conceivably cause damage to the wobbler and/or to other components in the power unit. This condition, termed "mechanical saturation", should be avoided, if possible.

Mechanical saturation can be avoided by introducing electrical saturation in the control system. This may be accomplished through the use of a limiter which limits the input command signal to values which insure that the wobbler will not be driven into contact with one of the stops. Most types of limiters are static in nature, i.e. the positive and negative saturation points for the limiter are determined in advance and are not varied during operation of the system. While such limiters prevent the undesirable mechanical saturation noted above, they tend to unduly limit the magnitude of the error signals generated by the summing junctions. This in turn introduces an undesirable increase in response time of the wobbler, which may in turn render the control system unsuitable in certain applications requiring fast response times.

Dynamic limiters have been devised wherein the positive and negative saturation points of the limiter are dynamically controlled. This is accomplished by utilizing a dynamically variable voltage source as a control input to the limiter. Such a limiter is disclosed in Beaudette U.S. Pat. No. 3,999,084. However, Beaudette does not disclose the precise construction of the variable voltage source, other than to note that it may comprise, for example, an amplifier. There is not disclosure or suggestion as to the nature of the signal developed by the variable voltage source, nor is there any disclosure or suggestion of how and in what type of circuit such a limiter might be used.

Furthermore, the Beudette limiter requires the use of multiple operational amplifiers, and hence it is a relatively complex circuit.

SUMMARY OF THE INVENTION

In accordance with the present invention, a servo loop or closed-loop control system for controlling an output device so that a specific load condition is attained utilizes a dynamic limiter which enables fast response without damage to the output device.

More specifically, there is disclosed herein a servo loop control system for controlling an output device in response to a command signal so that a desired load condition represented by the command signal is attained. The system includes means for developing an error signal representing the deviation of the load condition from the desired condition and forward and feedback paths at least one of which includes an impedance therein represented by a transfer function. The system further comprises a limiter having a variable saturation point which receives the command signal and is connected to the error signal developing means for controllably limiting the command signal together with means coupled to the limiter and the impedance for controlling the saturation point of the limiter in accordance with the transfer function of the impedance to enable fast response without damage to the output device.

In a specific embodiment of the instant invention, the closed-loop control system may be used to control a wobbler of a hydraulic power unit. In this case, the impedance comprises a transducer or other means for sensing an actual condition of the load. Also, the limiter control is responsive to the transducer or sensing means to control the limiter saturation point in accordance with the sensed load condition so that the wobbler can be operated in rapid fashion without causing mechanical saturation.

In this embodiment, the response time of the wobbler may be further decreased by sensing the displacement velocity of the wobbler and utilizing this signal in a feedback loop to modify the command signal.

Figure 1:
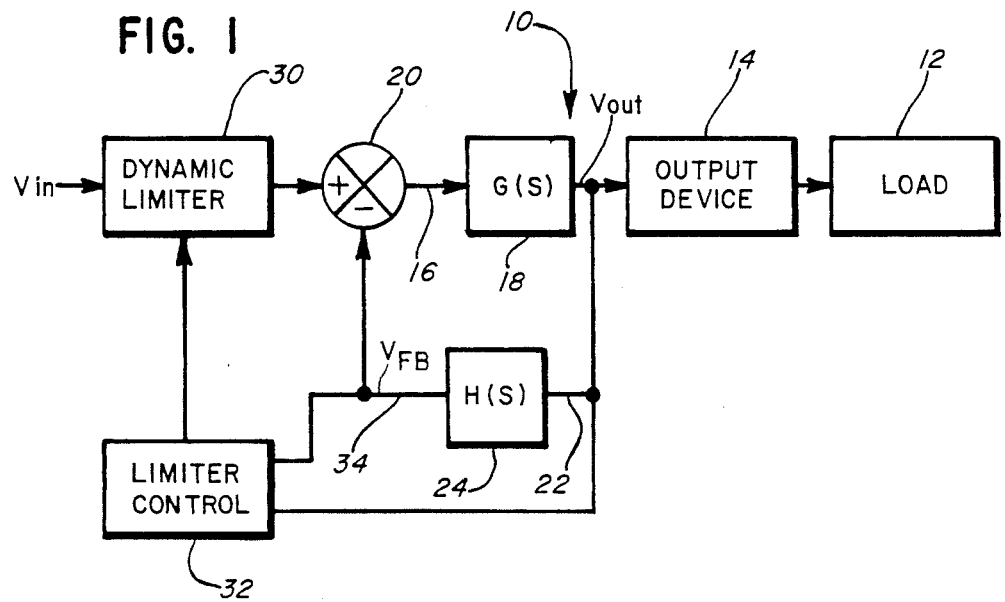
FIG. 1 is a block diagram of a servo loop or closed-loop control system according to the present invention.
Figure 5:
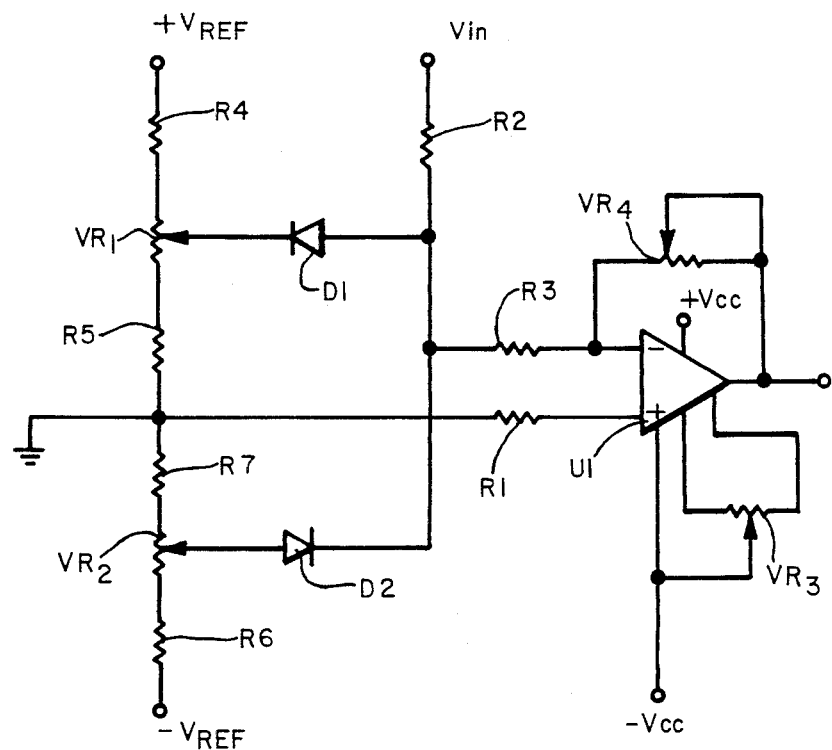
Figure 6:
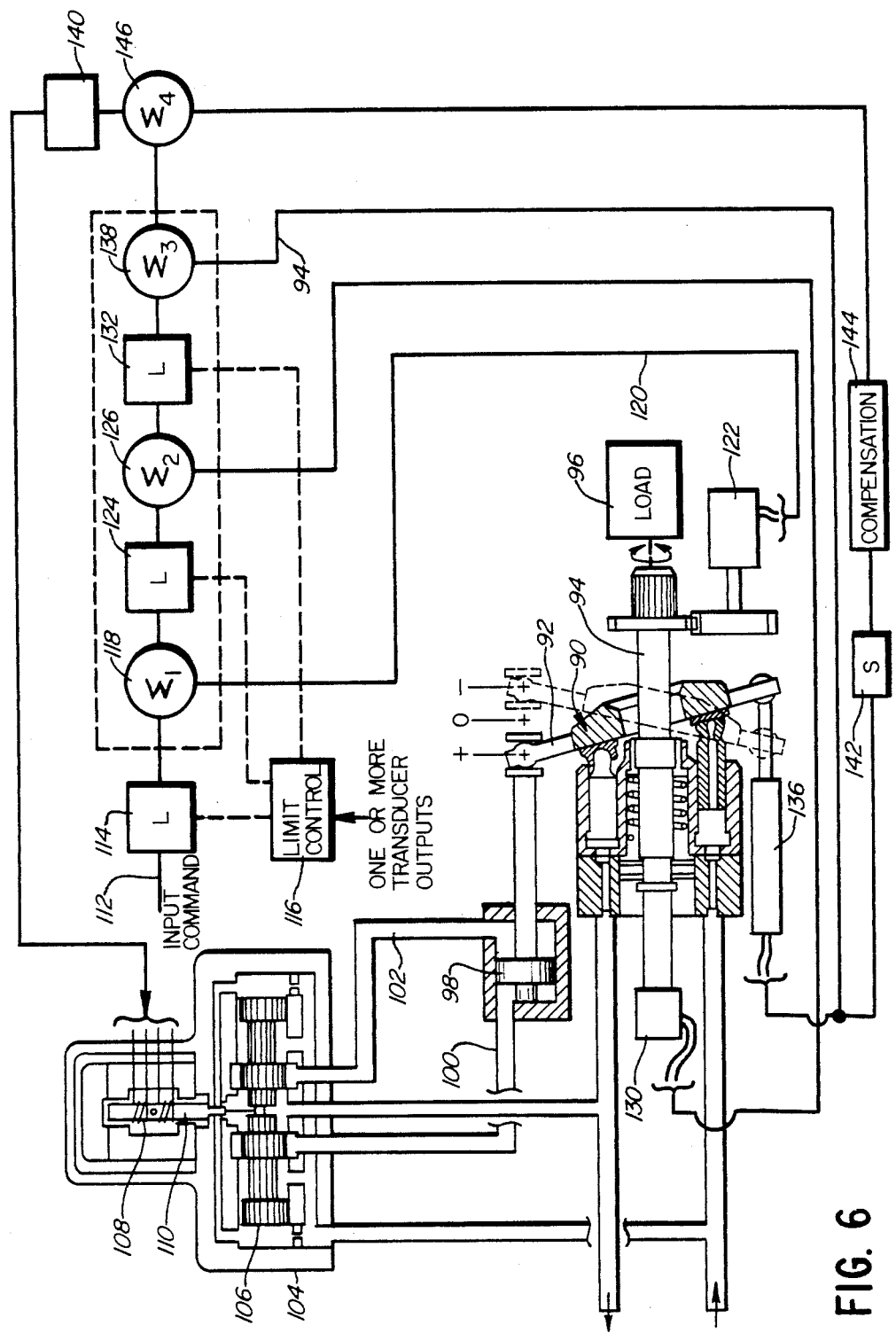

FIG. 5 is a schematic diagram of an analog embodiment of the limiters illustrated in FIGS. 1 and 6; and FIG. 6 is a combined schematic and block diagram of a servo loop-controlled hydraulic power unit wherein several power unit components are shwn in section.

BEST MODE FOR CARRYING OUT THE INVENTION

Referring now to FIG. 1, there is illustrated a generalized block diagram which illustrates a servo loop control system 10 according to the present invention. The control system 10 is responsive to an input command signal $V_i$ which is a signal representing a desired condition of a load 12. Typically, the condition of the load 12 is affected by an output device 14. Alternatively, in some closed-loop systems, the load is driven directly by the control system and hence the output device may be considered as the load and vice versa. The load condition may be, for example, load position, load velocity or any other load parameter.

The output device 14 receives a signal $V_{out}$ developed by a forward path 16 of the control system 10 having an impedance 18 receives an error signal developed by a summing junction 20 which compares the input command signal with a signal representing the load condition as developed by a feedback path 22 having an impedance 24 therein represented by a transfer function H(s).

While the feedback path 22 is illustrated as receiving the signal $V_{out}$ representing the voltage delivered to the output device 14, it should be noted that the feedback path 22 may in fact receive a signal from a transducer which senses a condition of the output device 14 or a transducer which senses a condition of the load 12. It should be noted that any of these signals may be considered representative of the condition of the load 12.

A dynamic limiter 30 receives the input command signal $V_{in}$ and modifies this signal before it is applied to a first input of the summing junction 20. The limiter 30 is controlled by a limiter control circuit 32 which is responsive to at least one of the output signal $V_{out}$ and a signal $V_{FB}$ developed on a line 34 coupled to the output of the impedance H(s). The limiter control 32 compensates for the transfer function of one or both of the impedances G(s) and H(s) so that dynamic limiting is provided by the limiter 30 only to the extent necessary to prevent mechanical saturation of the output device 14 and/or load 12. More specifically, the limiter control 32 operates the limiter 30 so that, when the output device 14 and/or load 12 are near the mechanical limits thereof, a relatively high degree of limiting is afforded by the limiter 30 when a command is received which would be likely to result in mechanical saturation of the output device 14 and/or load 12. On the other hand, when the command signal and the output device and/or load condition are such that no damage will occur to the output device 14 or the load 12 while attaining the commanded load condition, then little or no limiting is provided by the limiter 30.

The foregoing operation, therefore, provides limiting only as needed and hence the response time of the output device 14 and load 12 is substantially reduced with minimal risk of damage to either.

Figure 2:
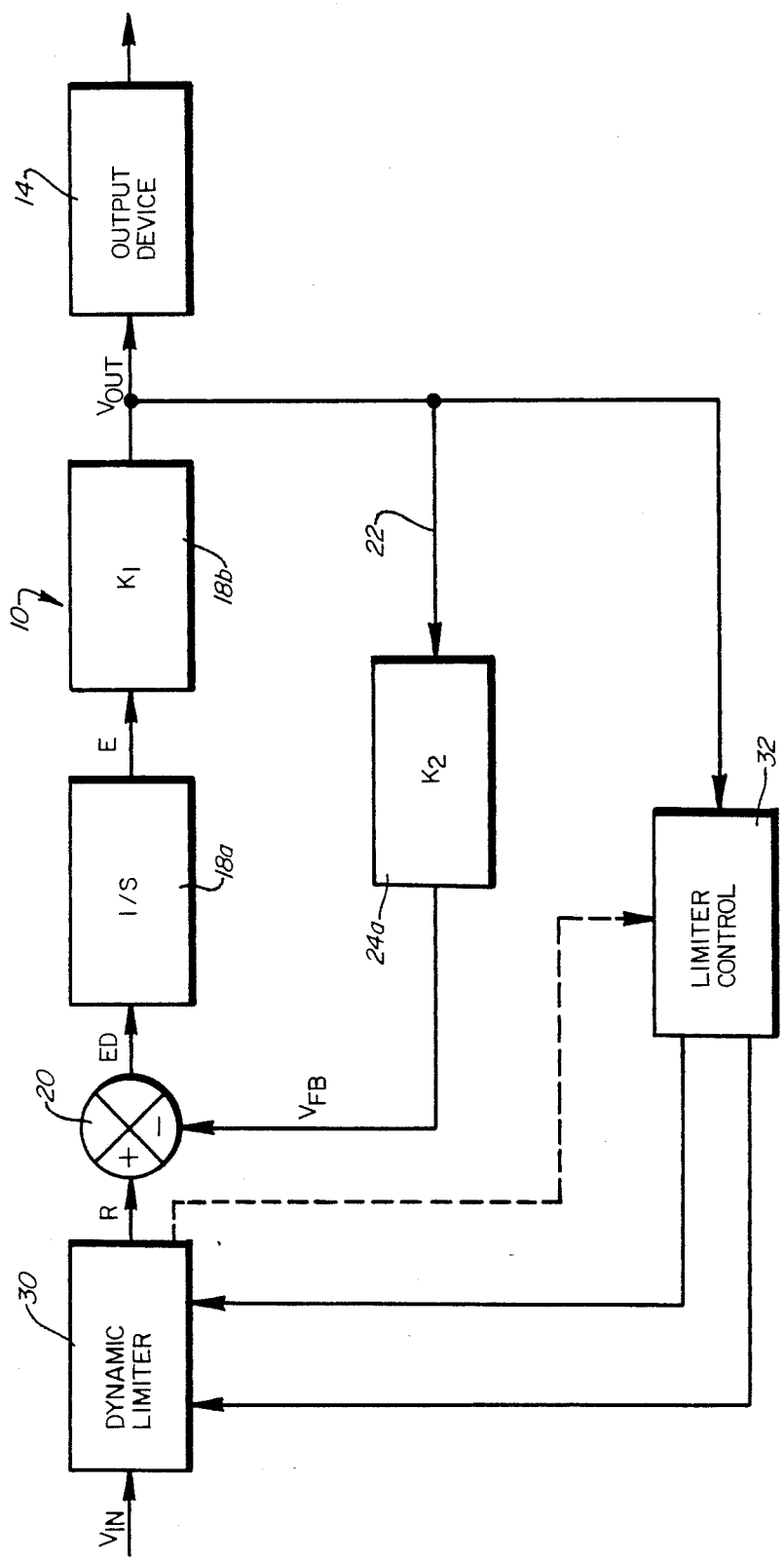
FIG. 2 is a block diagram of one embodiment of a servo loop or closed-loop control system according to the present invention.

Referring now to FIG. 2, there is illustrated one embodiment of a servo loop control system according to the present invention. The servo loop control system may be implemented by analog circuitry or may be implemented by software which is executed by a computer or other processor. In the latter case, appropriate digital-to-analog converters and amplifiers may be required to operate an output device and/or load controlled by the system.

It should be noted that elements common between FIGS. 1 and 2 are assigned like reference numerals. In the servo loop system of FIG. 2, the transfer function G(s) is replaced by an integrator 18a and a static or dynamic function 18b represented by a variable $K_1$. Further, the impedance H(s) in the feedback path 22 is represented by a static or dynamic function 24a represented by a variable $K_2$.

Figure 3A:
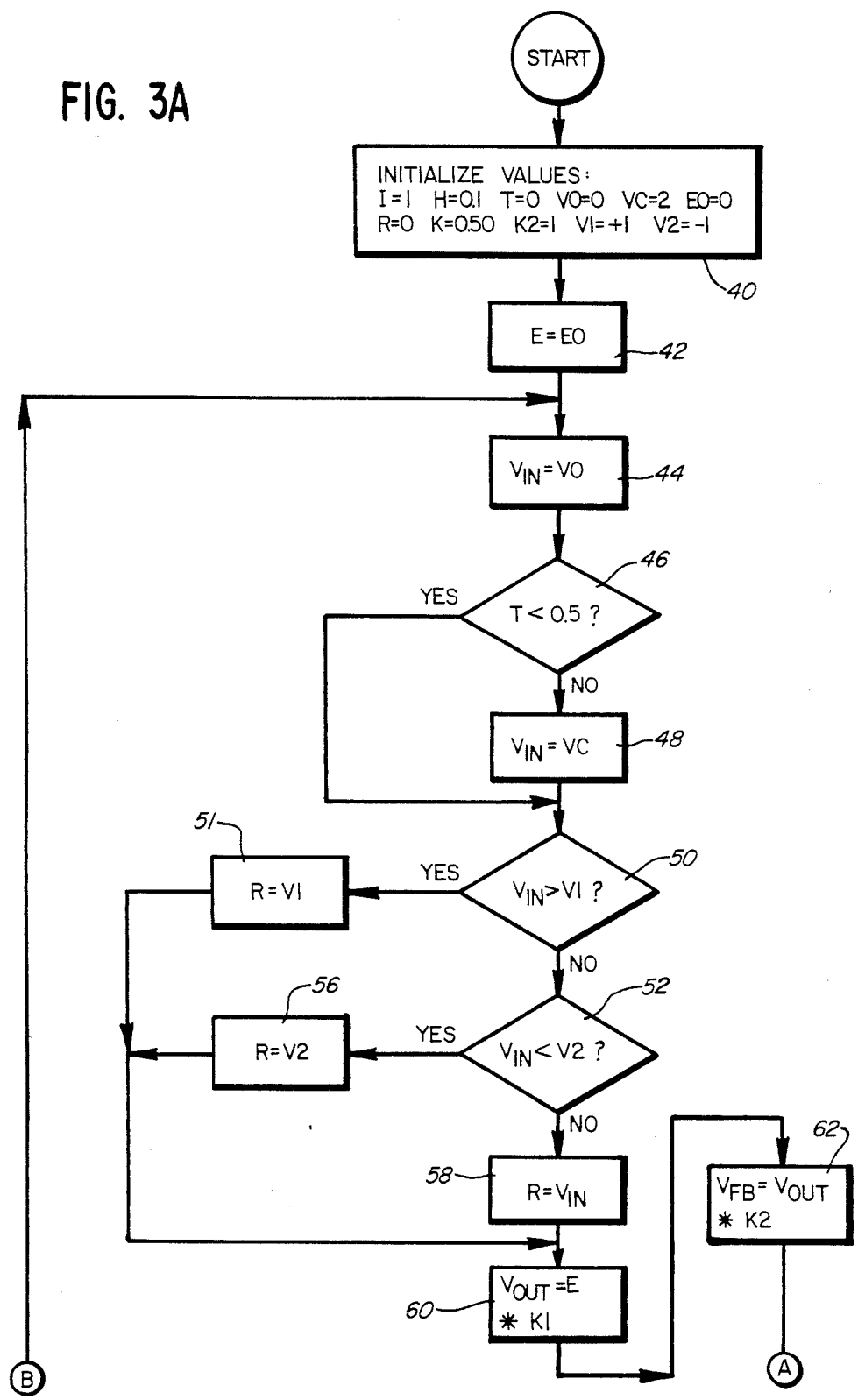
FIGS. 3A and 3B, when joined along similarly lettered lines, comprise a flow chart of programming which may be executed by a computer or other processor to implement the servo loop control system illustrated in FIG. 2.
Figure 3B:
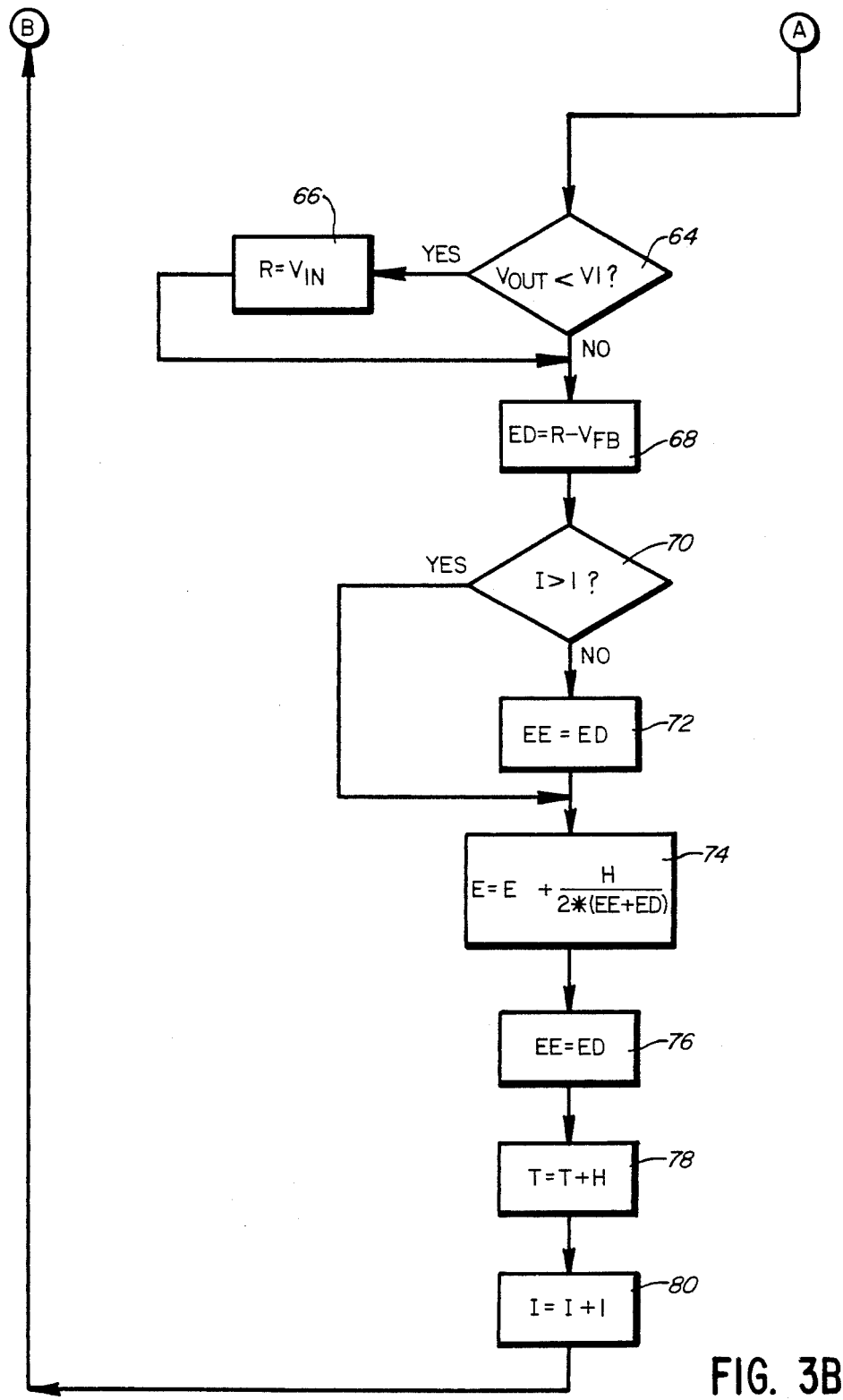

Referring also to FIGS. 3A and 3B, there is illustrated the programming which may be executed to implement the servo loop illustrated in FIG. 2. The programming implements a a simplified control scheme which provides limiting of the input command signal $V_{in}$ only when the output voltage $V_{out}$ is greater than the positive cut-off or saturation limit, denoted V1, of the dynamic limiter 30. As noted in greater detail below, this is a simplified control scheme for the limiter control 32, inasmuch as most practical applications will require a more sophisticated control of the limiter 30.

Referring specifically to FIG. 3A, the programming begins at a block 40 which initializes the values of constants and variables used in the control program.

A block 42 then sets the value of a variable E equal to a value E0 which was set by the block 40 equal to zero. The variable E represents the output of the integrator 18a as seen in FIG. 2.

A block 44 then sets the input command equal to a value V0 which was also established a zero by the block 40. The block 44 is utilized in a manner noted in greater detail hereinafter to simulate a step function input to the servo loop 10.

A block 46 then checks to determine whether the value of a variable T is less than 0.5. The variable T was set by the block 40 equal to zero and represents the elapsed time in the waveforms illustrated in FIGS. 4A and 4B. Following the block 46, a block 48 establishes the value of the input command signal $V_{in}$ equal to a value VC which was set by the block 40 to be equal to a value of two units. The combined function of the blocks 44–48 is to simulate a step input command signal which is at zero until one-half second in duration, following which the input command is at a value of two units.

Following the block 48, a block 50 checks to determine whether the input command signal is greater than the upper cut-off limit V1 of the dynamic limiter 30. If this is the case, the output R of the dynamic limiter 30 is set equal to the value V1. On the other hand, if the input command $V_{in}$ is not greater than the cut-off V1, a block 52 checks to determine whether the input command is less than the negative or lower cut-off limit V2 of the limiter 30. If so, the output R of the limiter 30 is set equal to the value V2. If it should occur that the input command signal is between or equal to one of the levels V1 and V2, a block 58 sets the output R of the dynamic limiter 30 equal to the input $V_{in}$. This, in effect, established the gain of the limiter at one.

Once the value of R has been established by the blocks 52, 56, 58, a block 60 and a block 62 implement the static or dynamic processes $K_1$ and $K_2$. A block 64, FIG. 3B, then checks to determine whether the signal $V_{out}$ is less than the upper limit V1 of the dynamic limiter 30. If so, then it has been determined that limiting of the input command signal $V_{in}$ is not required and hence the output R of the dynamic limiter 30 is set equal to the input command $V_{in}$ by a block 66. On the other hand, if the signal $V_{out}$ is not less than the upper cut-off limit V1, then the block 66 is bypassed and control passes directly to a block 68.

The purpose of the blocks 64 and 66 is to implement a control law for the limiter control 32 wherein limiting is accomplished only when the output signal $V_{out}$ is less than the upper or positive limit V1 and the input command $V_{in}$ is greater than the upper limit V1 or less than the lower limit V2.

The block 68 generates a signal ED which is equal to the output of the limiter 30 minus the feedback signal $V_{FB}$. The block 68 therefore accomplishes the function of the summing junction 20 shown in FIG. 2.

A block 70 then checks to determine whether the value of a loop counter I, initialized to one by the block 40, is greater than one. The counter I indicates the number of times the control program has been executed. If this is the first pass through the program, a variable EE is set equal to the value of the signal ED from the summing junction 20.

On the other hand, if I is greater than one, then the block 72 is bypassed and control passes directly to a block 74.

The block 74 integrates the signal ED using a trapezoidal approximation control equation. In essence, the control equation utilizes a value EE, which is the value ED calculated by the block 68 during the last pass through the control program. In the first pass through the control program, the value EE is equal to a value E0 which was initialized by the block 40 to a value of zero. The block 74 therefore develops the signal E at the output of the integrator 18a.

A block 76 assigns the value ED to the value EE for use in the trapezoidal integration on the next pass through the control program. Control then passes to a pair of blocks 78,80 which update the time variable T by an incremental value H and increment the loop counter I by one.

Figure 4A:
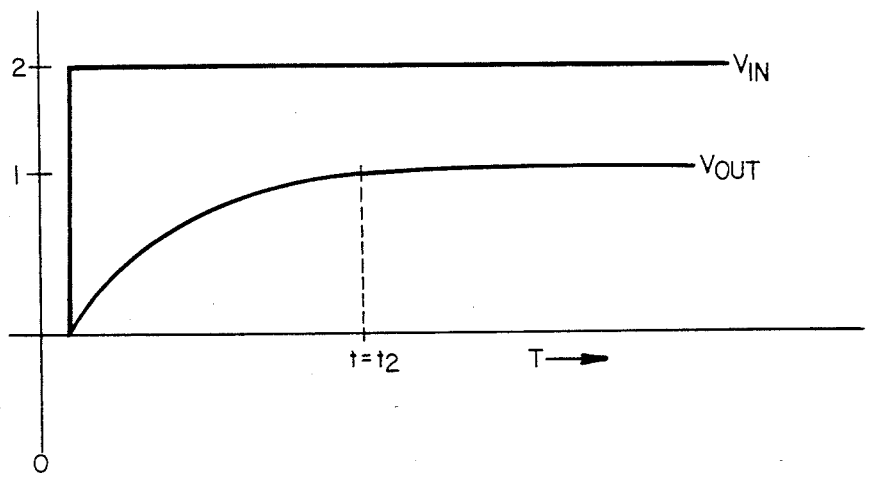
FIGS. 4A and 4B are waveform diagrams illustrating the response of the servo loop control system of FIG. 2 without and with the dynamic limiting afforded by the limiter illustrated therein, respectively.
Figure 4B:
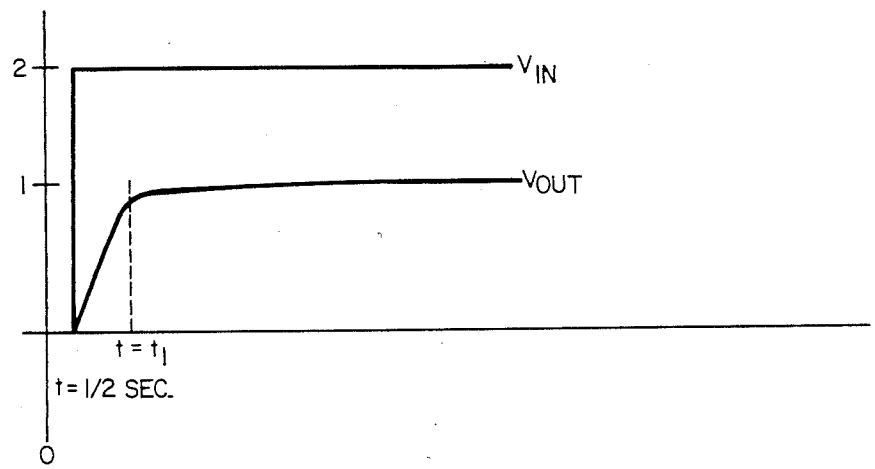

As seen specifically in FIG. 4B, it can be seen that the signal $V_{out}$ developed by the servo loop system of FIG. 2 reaches its final value at a time $t=t_1$. The waveform of FIG. 4A illustrates the response of the same system with the blocks 64 and 66 deleted from the control program, which, in effect, removes the dynamic limiting function. It can be seen that the signal $V_{out}$ reaches its final value at a time $t=t_2$ which is later than the time $t=t_1$. A comparison of the waveforms of FIGS. 4A and 4B therefore illustrates the improved response time afforded by the dynamic limiting.

It should be noted that the waveform of FIG. 4B is simplified in that it does not illustrate overshoot of the signal $V_{out}$ beyond its final value. This overshoot, although minor, may be considered objectionable in certain circumstances. In this case, this overshoot can be reduced or eliminated by utilizing a more complex control law for the dynamic limiter 30.

As previously noted, the servo loop illustrated in FIG. 2 may be implemented in software. This system may also be implemented in hardware, in which case the dynamic limiter 30 may be of the type disclosed and claimed in applicant's copending application Ser. No. 900,722, filed Aug. 27, 1984, entitled "Controllable Limiter", assigned to the assignee of the instant application and the disclosure of which is hereby incorporated by reference. The limiter is illustrated in FIG. 5 as comprising a single operational amplifier U1 having a noninverting input which receives ground potential through a resistance $R_1$ and an inverting input which receives the input command signal $V_i$ through resistors $R_2$ and $R_3$. The junction between the resistors $R_2$ and $R_3$ is coupled through diodes $D_1$ and $D_2$ to first and second potentiometers $VR_1$ and $VR_2$, respectively. The potentiometer $VR_1$ is coupled to a source of controlled voltage $+V_{REF}$ through a resistor $R_4$ and is further coupled through a resistor $R_5$ to ground potential.

The potentiometer $VR_2$ is coupled to a second source of controlled voltage $-V_{REF}$ through a resistor $R_6$ and is additionally coupled through a resistor $R_7$ to ground potential.

A third potentiometer $VR_3$ is coupled to control inputs of the operational amplifier 40 to permit adjustment of the offset bias thereof. A fourth potentiometer $VR_4$ is coupled between the output of the op amp and the inverting input and affords manual adjustment of the gain of the limiter when operating in its linear amplification range.

In practice, the positive and negative saturation points of limiter may be varied by suitable manual adjustment of the potentiometers $VR_1$ and $VR_2$. Further, in the preferred embodiment, the limiter is operated in a dynamic mode by modulating the voltages $+V_{REF}$ and $-V_{REF}$ applied to the resistors $R_4$ and $R_6$, respectively. In this case, the limiter control 32 develops first and second outputs which are coupled to the resistors $R_4$ and $R_6$, respectively, so that the appropriate dyanmic limiting is provided by the limiter 30.

Additional detail concerning the limiter illustrated in FIG. 5 may be obtained by reference to the above-identified patent application.

Referring now to FIG. 6, there is illustrated a specific embodiment of the present invention. The servo loop control system shown in FIG. 6 is particularly adapted for use in controlling a hydraulic power unit 90 having a swashplate or wobbler 92 which is variably displaceable to in turn vary the torque developed at an output shaft 94. The shaft 94 is in turn coupled to and drives a load 96 such as a component of a flight control system of an aircraft. The displacement of the wobbler 92 is controlled by a control piston 98 which is in turn responsive to the admittance of pressurized fluid through passages 100,102. The passages 100,102 are coupled to a servo valve 104 having a spool 106 therein which is axially movable to control the flow of pressurized fluid through the passages 100,102, as is conventional.

In a general sense, the servo valve 104 includes control windings 108 which receive a signal that controls the position of a flapper 110 and the spool 106.

The particular servo valve type discussed above and shown in FIG. 6 is not critical to the invention and in fact, may be replaced by another valve type, if desired, such as a direct drive servo valve. Also, the wobbler type hydraulic limit may be replaced by a different hydraulic motor, if desired.

An input command signal representing a desired condition of the load 96, such as load position, is developed on a line 112 and is coupled to a first limiter 114 which may be that illustrated in FIG. 5. The limiter is controlled by a limiter control circuit 116 which is similar to the limiter control 32 illustrated in FIG. 1. The output of the limiter 114 is coupled to an input of a first summing junction 118. A further input of the summing junction 118 receives a signal on a line 120 representing a load condition, such as the position of the load, as developed by a position transducer 122.

The first summer 118 subtracts the signal at its inputs to develop an error signal which may be considered as representing the command speed of the load 96. This signal is limited by a second limiter 124 which may be identical to the limiter 114 and which is controlled by the limit control circuit 116. The output of the limiter 124 is coupled to an input of a second summer 126 having a further input which receives a signal representing the speed of the output shaft 94 as developed by a speed transducer 130. The resulting speed error signal is limited by a third limiter 132 which may again be identical to the dynamic limiter 114 and which is controlled by the limit control circuit 116. This limited speed error signal may be considered as representing the desired displacement of the wobbler 92 and is combined with a signal on a line 134 developed by a position transducer 136 representing the actual position or displacement of the wobbler 92 by a third summer 138. The resultant signal is a wobbler displacement error signal which may be coupled directly to a current driver 140, if desired, to provide a control signal to the windings 108 of the servo valve 104.

The limiter control circuit 116 is responsive to one or more impedances in the servo system, such as one or more of the load position transducer 122, the speed transducer 130 and the position transducer 136 and develops controlled voltages which are coupled to the limiters 114, 124 and 132 to adjust the positive and negative saturation limits of same, as noted more specifically below.

In the preferred embodiment, a further feedback loop is included between the summer 138 and the current driver 140. This further feedback loop comprises, in one embodiment, a differentiator 142 and a gain and compensation network 144 which together develop a signal representing the rate of displacement of the wobbler 92. This signal is summed by a fourth summer 146 with the output of the summer 138 before such signal is applied to the current driver 140. This further feedback loop improves the response time of the wobbler as compared with a system not utilizing this feedback signal.

It should be noted that the circuitry for generating the wobbler rate of displacement signal may be replaced by a speed transducer; however, this requires the addition of a further transducer to the control system which may be undesirable in certain applications. If this speed transducer is used, the limiter control 116 may be responsive to the output of this transducer as well as one or more of the other transducers 122, 130 and 136.

It should also be noted that one or more of the limiters 114, 124, 132 may be a static limiter, if desired. In this cae, the limiter control circuit 116 may be simplified, since it need only control one or two limiters.

I claim:

1. A servo system for controlling an output device in response to a command signal so that a desired load condition represented by the command signal is attained including means for developing an error signal representing the deviation of the load condition from the desired condition and forward and feedback paths at least one of which includes an impedance therein represented by a transfer function, comprising:
    a limiter receiving the command signal and connected to the error signal developing means for controllably limiting the command signal wherein the limiter has a variable saturation point; and
    means coupled to the limiter and to the impedance for controlling the saturation point of the limiter in accordance with the transfer function of the impedance to enable fast response without damage to the output device.

2. The servo system of claim 1, wherein the output device comprises a wobbler of a hydraulic power unit, the wobbler being variably displaceable to in turn vary the speed of an output shaft which drives a load and wherein the impedance comprises at least one transducer for sensing at least one of the wobbler position, the wobbler displacement speed, the load position and the output shaft speed.

3. The servo system of claim 1, wherein the limiter includes first and second inputs coupled to the controlling means.

4. A closed-loop control for a hydraulic power unit having a wobbler which is variably displaceable to vary the speed of an output shaft coupled to a load, comprising:
    a limiter receiving a command signal representing a desired condition of the load and having a variable saturation point for controllably limiting the command signal;
    means for sensing the actual condition of the load;
    a summer coupled to the limiter and to the sensing means for generating an error signal representing the deviation of the actual load condition from the desired load condition, the error signal being used to control the displacement of the wobbler so that the actual load condition approaches the desired load condition; and
    a limiter control responsive to the sensing means for controlling the limiter saturation point in accordance with the sensed load condition to that the wobbler can be controlled quickly without damage thereto.

* * * * *